United States Patent
Lai

(10) Patent No.: US 8,605,193 B2
(45) Date of Patent: Dec. 10, 2013

(54) PORTABLE ELECTRONIC DEVICE WITH CAMERA MODULE

(75) Inventor: Cheng-Yi Lai, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 290 days.

(21) Appl. No.: 12/859,421

(22) Filed: Aug. 19, 2010

(65) Prior Publication Data
US 2011/0157450 A1 Jun. 30, 2011

(30) Foreign Application Priority Data
Dec. 25, 2009 (TW) ................. 98144925 A

(51) Int. Cl.
*H04N 5/225* (2006.01)
*G03B 15/02* (2006.01)

(52) U.S. Cl.
USPC ............................ 348/335; 348/373; 396/55

(58) Field of Classification Search
USPC .......... 348/335, 340, 373, 374; 359/811, 819, 359/823–824; 396/55, 133–134
See application file for complete search history.

(56) References Cited

U.S. PATENT DOCUMENTS

| 2006/0133738 A1* | 6/2006 | Marcinkiewicz et al. ...... 385/88 |
| 2007/0081821 A1* | 4/2007 | Izumi et al. .................... 396/448 |
| 2008/0019026 A1* | 1/2008 | Feng et al. ..................... 359/819 |
| 2009/0225454 A1* | 9/2009 | Yoshioka et al. ............. 359/824 |
| 2009/0322927 A1* | 12/2009 | Ito et al. ........................ 348/335 |
| 2010/0053772 A1* | 3/2010 | Oh et al. ....................... 359/736 |

FOREIGN PATENT DOCUMENTS

| CN | 1780363 | 5/2006 |
| CN | 1940614 | 4/2007 |

* cited by examiner

*Primary Examiner* — Lin Ye
*Assistant Examiner* — Mekonnen Dagnew
(74) *Attorney, Agent, or Firm* — Altis Law Group, Inc.

(57) ABSTRACT

A portable electronic device includes a housing defining a through hole, a barrel positioned in the housing, a lens fixed at an end of the barrel and a light detection unit fixed at the other end of the barrel away from the lens. The lens includes an imaging portion facing the light detection unit and an incidence portion facing the through hole. The incidence portion forms a reflecting surface angled relative to an optical axis of the imaging portion, such that light entering from the through hole through the incidence portion is then reflected by the reflecting surface and refracted by the imaging portion, and is then received by the light detection unit.

10 Claims, 2 Drawing Sheets

PORTABLE ELECTRONIC DEVICE WITH CAMERA MODULE

BACKGROUND

1. Technical Field

The present disclosure relates to portable electronic devices and particularly, to a portable electronic device with a camera module.

2. Description of the Related Art

Portable electronic devices such as cell phones often include a camera module seated in its housing for capturing images. The housing defines a through hole at a surface. The camera module is seated in the housing and receives light via the through hole and captures an image accordingly. With ongoing efforts to continually reduce volume and weight of such electronic devices, length of the camera module decreases accordingly. However, quality of the image decreases significantly when the camera module is shortened.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views, and both the views are schematic.

DETAILED DESCRIPTION

Figure 1:
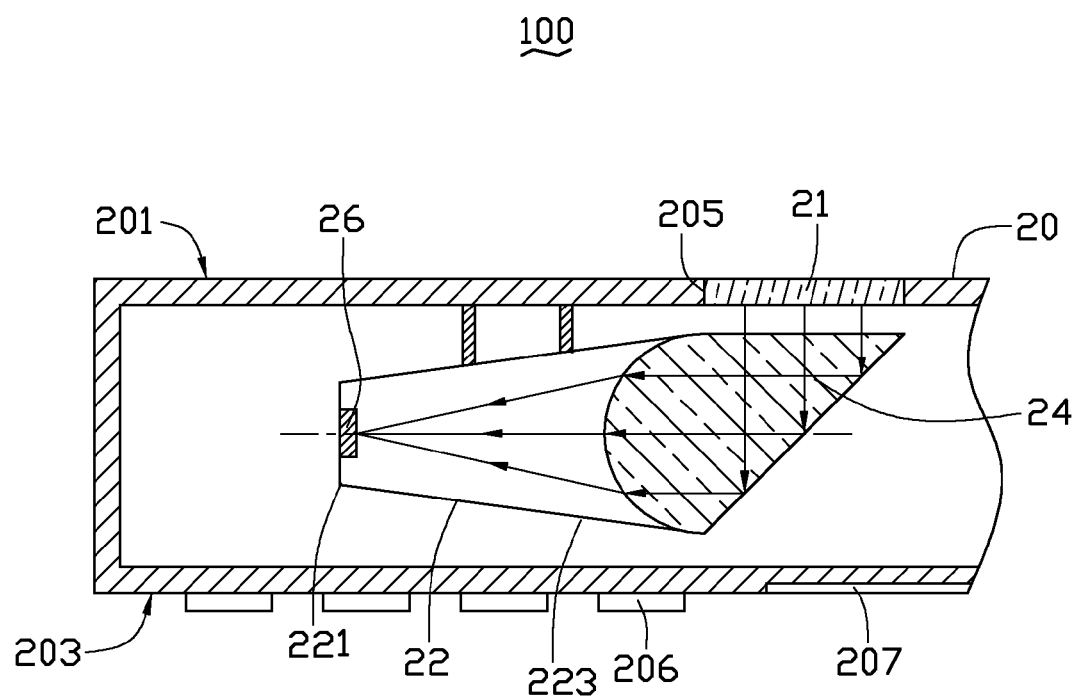
FIG. 1 is a cross section of an embodiment of a portable electronic device including a lens.

Referring to FIG. 1, an embodiment of a portable electronic device 100 includes a housing 20, a transparent sheet 21, a barrel 22, a lens 24 and a light detection unit 26. The housing 20 includes a first surface 201 and a second surface 203 opposite to the first surface 201. The housing 20 defines a through hole 205 for receiving the transparent sheet 21 at the first surface 201. The housing 20 further includes a keyboard 206 and a display 207 at the second surface 203. The barrel 22 is substantially a frustum cone and includes a first end portion 221 on which the light detection unit 26 is mounted, and a second end portion 223 on which the lens 24 is mounted. A diameter of the first end portion 221 is less than that of the second end portion 223.

Figure 2:
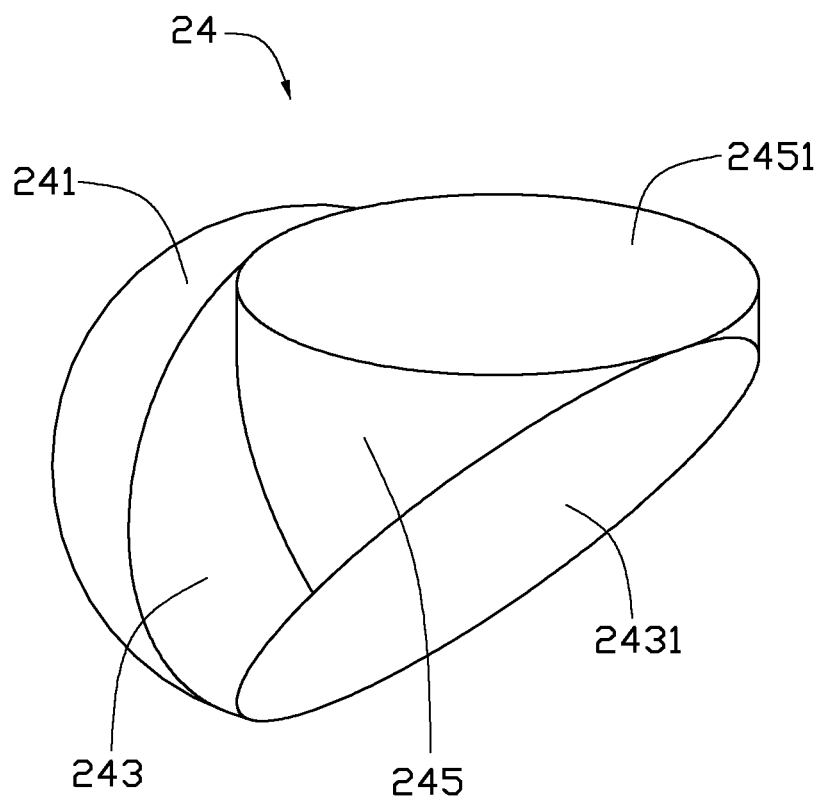
FIG. 2 is an isometric view of the lens shown in FIG. 1.

Referring also to FIG. 2, the lens 24 includes an imaging portion 241, a connecting portion 243 and an incidence portion 245. The connecting portion 243 is substantially cylindrical. The imaging portion 241 is a substantially convex lens, formed at an end of the connecting portion 243. An optical axis of the imaging portion 241 is parallel to a central axis of the connecting portion 243. The incidence portion 245 is formed at the other end of the connecting portion 243 away from the imaging portion 241. The incidence portion 245 is also substantially cylindrical, with a central axis substantially perpendicular to a central axis of the connecting portion 243. The incidence portion 245 forms a reflecting surface 2431 at an end adjacent to the connecting portion 243 and an incident surface 2451 at the other end away from the connecting portion 243. The incidence portion 245 forms a high reflection layer (not shown) on the reflecting surface 2431. In the illustrated embodiment, the reflecting surface 2431 is angled relative to the optical axis of the connecting portion 243 by about 45°, thus light parallel with the central axis of the incidence portion 245 may be reflected by the reflecting surface 2431, and transmitted along a direction parallel with the central axis of the connecting portion 243. In the illustrated embodiment, the incident surface 2451 is flat and substantially coplanar with a top of the connecting portion 243, to reduce the height of the lens 24. In alternative embodiments, the incident surface 2451 may be curved as a convex lens or concave lens, and forming an image in combination with the imaging portion 241 cooperatively.

The transparent sheet 21 is glued in the through hole 205. The light detection unit 26 is fixed in the first end 221 of the barrel 22. The lens 24 is fixed in the second end 223 of the barrel 22, and the imaging portion 241 faces the light detection unit 26, and the incidence portion 245 protrudes out of the barrel 22. The barrel 22 is seated in the housing 20, and the incident surface 2451 faces the transparent sheet 21, whereby light from the transparent sheet 21 enters the incidence portion 245 and is reflected by the reflecting surface 2431, refracted by the imaging portion 241, and finally received by the light detection unit 26. That is, the barrel 22 may be positioned at a side of the through hole 205, with length thereof not limited by a thickness of the housing 20, and can be extendable, such that the image quality of captured image for distant subjects is improved. The imaging portion 241, the connecting portion 243 and the incidence portion 245 are integrally formed, for easier manufacture. There is no gap between the connecting portion 243 and the imaging portion 241, and between the connecting portion 243 and the incidence portion 245, therefore the light loss inside the lens 24 is reduced.

It should be understood that the connecting portion 243 may be omitted, whereby the incidence portion 245 is formed on the imaging portion 241 directly.

Finally, while particular embodiments have been described, the description is illustrative and is not to be construed as limiting. For example, various modifications can be made to the embodiments by those of ordinary skill in the art without departing from the true spirit and scope of the invention as defined by the appended claims.

What is claimed is:

1. An portable electronic device comprising:
a housing defining a through hole;
a substantially frustum cone barrel positioned in the housing;
a lens fixed at an end of the barrel; and
a light detection unit fixed at the other end of the barrel away from the lens, a diameter of the end which the light detection unit fixed at being less than that of the end which the lens fixed at, the lens comprising:
an imaging portion facing the light detection unit; and
an incidence portion facing the through hole,
wherein the incidence portion forms a reflecting surface angled relative to an optical axis of the imaging portion, such that light from the through hole entering the incidence portion is reflected by the reflecting surface, refracted by the imaging portion and received by the light detection unit, the lens further comprises a connecting portion, the connecting portion is directly connected to the imaging portion and the incidence portion, all of the connecting portion, the imaging portion, and the incidence portion are integrally formed together, the connecting portion is cylindrical, the imaging portion is a convex lens, the optical axis of the imaging portion is substantially parallel to a central axis of the connecting portion, and an optical axis of the incidence portion is substantially perpendicular to the central axis of the connecting portion; there is no gap between the connecting portion and the imaging portion, and there is no gap between the connecting portion and the incidence portion.

2. The portable electronic device of claim 1, wherein the reflecting surface is adjacent to the connecting portion and angled relative to the central axis of the connecting portion by 45°.

3. The portable electronic device of claim 1, wherein the incidence portion forms an incident surface at an end away from the connecting portion.

4. The portable electronic device of claim 3, wherein the incident surface is flat.

5. The portable electronic device of claim 4, wherein the incident surface is substantially coplanar with a top of the connecting portion.

6. The portable electronic device of claim 3, wherein the incident surface is curved as a concave lens and forming an image in combination with the imaging portion cooperatively.

7. The portable electronic device of claim 1, wherein the portable electronic device further comprises a transparent sheet, and the transparent sheet is glued and fixed in the through hole.

8. The portable electronic device of claim 1, wherein the lens further comprises a reflection layer on the reflecting surface.

9. The portable electronic device of claim 1, wherein the housing comprises a first surface and a second surface opposite to the first surface, the through hole is defined at the first surface, and a display and a keyboard at the second surface.

10. The portable electronic device of claim 1, wherein the incidence portion protrudes out of the barrel.

\* \* \* \* \*